United States Patent [19]
Stellinger et al.

[11] 4,232,578
[45] Nov. 11, 1980

[54] SAW BLADE AND METHOD OF MAKING

[75] Inventors: Thomas S. Stellinger, Weston; Stephen R. Crosby, Sterling, both of Mass.

[73] Assignee: Wallace Murray Corporation, Fitchburg, Mass.

[21] Appl. No.: 56,138

[22] Filed: Jul. 9, 1979

[51] Int. Cl.³ .................................. B27B 33/06
[52] U.S. Cl. .................................. 83/661; 76/112; 83/835; 83/855
[58] Field of Search .................. 83/835, 855, 661; 76/112

[56] References Cited

U.S. PATENT DOCUMENTS

| 521,343 | 6/1894 | Hazard | 83/855 |
|---|---|---|---|
| 552,370 | 12/1895 | Holley | 83/855 |
| 1,955,137 | 4/1934 | Lee | 83/852 |
| 2,510,462 | 6/1950 | Christenson | 76/112 X |
| 3,034,378 | 5/1962 | Anderson | 76/112 |

Primary Examiner—Frank T. Yost

[57] ABSTRACT

A saw blade having improved metal cutting characteristics in which the tip of each tooth is formed to provide a primary rake face extending from the tip of the tooth for a distance of 0.007 to 0.020 inch and having a positive rake angle of 12° to 25°, a secondary rake face extending from the primary rake face to the gullet of the tooth and having a positive rake angle less than 12°, a primary end relief surface extending from the tip of the tooth for a distance of 0.007 to 0.030 inch and forming a relief angle of 10° to 25°, and a secondary end relief surface extending from the primary end relief surface to the gullet of the next successive tooth and forming a relief angle greater than the relief angle of the primary end relief surface. The blade can be made by applying a deforming force to the tips of the teeth of a precursor saw blade.

9 Claims, 2 Drawing Figures

SAW BLADE AND METHOD OF MAKING

This invention relates to a saw blade particularly useful for cutting metal and a method of making the same, and pertains more specifically to such a saw blade in which the tip of each tooth is formed to provide a primary rake face extending 0.07 to 0.020 inch from the tip and having a positive rake angle of 12° to 25°, and a secondary rake face extending from the primary rake face to the gullet of the tooth and having a positive rake angle less than 12°, a primary end relief surface extending from the tip for a distance of 0.07 to 0.030 inch having a relief angle of 10° to 25°, and a secondary end reief surface extending from the primary end relief surface to the gullet of the next succeeding tooth and having a relief angle greater than that of the primary end relief surface. The invention also relates to a method of making such saw blade by applying a deforming force to the tips of the teeth of a saw blade.

There has long existed a need for a saw blade capable of cutting metal and metal alloys at high speeds and at minimum feed forces. Although it has been generally known that increasing the positive rake angle of saw teeth, within certain limits, provides better penetration of the workpiece independently of the feed forces applied between the saw blade and the workpiece, the resultant reduction in tooth strength and the cost of manufacturing blades having high positive rake angles of conventional shape have militated against the manufacture of blades, the teeth of which have positive rake angles greater than about 10°.

It has now been found that saw blades in which each tooth has only a very limited portion of the tip, extending for a distance of no more than 0.020 inch, formed to provide a desired high positive rake angle with an accompanying decrease in end relief angle at the tip, exhibit the desired improved metal cutting characteristics with little or no loss of tooth strength even though the remainder of the tooth has a small positive rake angle less than 12°. It has further been found that saw blades having such teeth can readily be made by applying to the tips of the teeth of conventional saw blades a deforming force directed downwardly and forwardly toward the gullets of the teeth.

The saw blades of the present invention are those in which each tooth comprises a primary rake face extending from the tooth tip for a distance of 0.007 to 0.020 inch and having a positive rake angle of 12° to 25°, a secondary rake face extending from the primary rake face to the gullet of the tooth and having a positive rake angle of less than 12°, a primary end relief surface extending from the tooth tip for a distance of 0.007 to 0.030 inch and forming a relief angle of 10° to 25°, and a secondary end relief surface extending from said primary end relief surface to the gullet of the next succeeding tooth of said blade and forming a relief angle greater than that of the primary end relief surface. Each rake face and end relief surface need not be straight or flat, but may be curved gently provided that all portions of it exhibit an angle within the ranges specified.

In a preferred embodiment, the secondary rake face of each tooth has a positive rake angle of 0° to less than 12° and the secondary end relief surface forms a relief angle of 30° to 40°. In another preferred embodiment, the height of each tooth measured from the bottom of the gullet perpendicularly to a line joining the tips of successive teeth (i.e., measured in a direction at right angles to the line) is equal to 40% to 60% of the pitch of the teeth (i.e., the distance between tips of adjacent teeth), and the gullet of each tooth has the shape of an arc having a radius equal to 20 to 30% of the pitch of the teeth.

In the preferred method of making the saw blades of the present invention, there is first provided a precursor saw blade in which each tooth has a rake face extending from the tip to the gullet and having a positive rake angle less than 12°, and an end relief surface extending from the tip of the tooth to the gullet of the next succeeding tooth and forming a relief angle greater than 20°, and applying to the tip of each tooth a deforming force in a direction downwardly and forwardly toward the gullet to form a primary rake face extending from the tooth tip for a distance of 0.07 to 0.020 inch and having a positive rake angle of 12° to 25° and to form a primary end relief surface extending from the tooth tip for a distance of 0.07 to 0.030 inch and forming a relief angle of 10° to 25°. Preferably, the precursor saw blade has a positive rake angle of 0° to less than 12° and an end relief surface forming a relief angle of 30° to 40°.

It will be understood that the rake angle of a tooth is measured with respect to a baseline extending from the tip of the tooth in a direction perpendicularly downwardly from a line joining the tips of adjacent teeth (in the case of band saw blades and hacksaw blades) or extending from the tip of the tooth radially inwardly to the center of the blade (in the case of circular saw blades). The relief angle of the end relief surface is measured with respect to a line extending between the tips of adjacent teeth (in the case of band saw blades and hacksaw blades) and with respect to a tangent to the blade radius at the tip of the tooth (in the case of a circular saw blade). In the case of all saw blades of the present invention, the height of a tooth is measured from a line joining the tips of adjacent teeth perpendicularly to the bottom of the gullet, and the pitch is the distance between the tips of adjacent teeth. It will also be appreciated that the teeth of the saw blades of the present invention may be set (i.e., bent laterally) in any desired set pattern without loss of the benefits of the invention. The primary rake face and primary end relief surface in every case extend across the full thickness of the tooth from one side to the other.

Other features and advantages of the invention will appear from the following description of a preferred embodiment taken together with the attached drawings in which.

Figure 1:
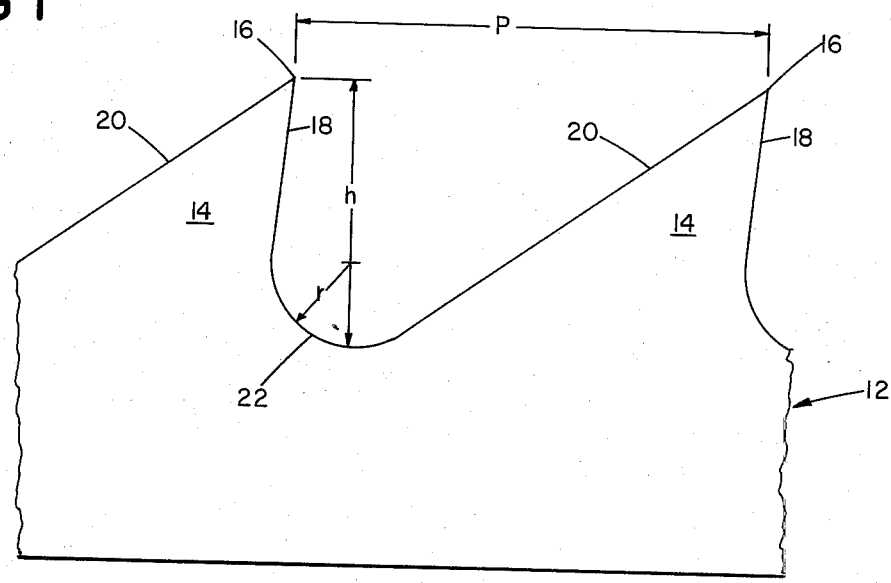
FIG. 1 is a view in side elevation, partly broken away, showing one embodiment of a band saw precursor blade for making a band saw blade of the present invention.

As shown in the drawing, a conventional band saw blade 12 is provided having a plurality of teeth 14,14, the tips 16,16 of which are formed by the intersection of rake face 18 with end surface 20. In this embodiment, rake face 18 has a positive rake angle of 5° measured with respect to a line extending vertically downwardly from a line connecting the tips 16,16 of successive teeth. The spacing between successive tooth tips, indicated by P in FIG. 1, is the pitch and is preferably no more than ½ inch. End relief surface 20 of each tooth forms a relief angle of 35° with respect to a line joining the tips of successive teeth and is connected to the rake face 18 of the next successive tooth by gullet 22. The gullet is in the form of an arc of a circle having radius r as shown in FIG. 1, equal to approximately one-fourth of pitch P. The height of each tooth 14, indicated by h in FIG. 1, measured from a line connecting successive tips 16,16 perpendicularly to the bottom of gullet 22 is approximately one-half the pitch P.

Figure 2:
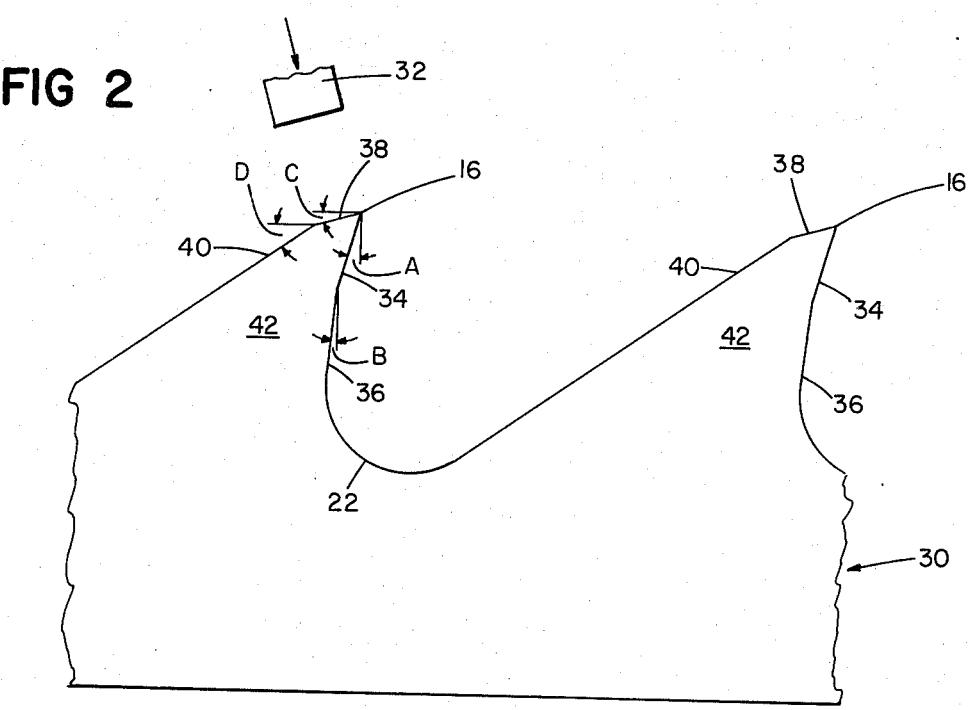
FIG. 2 is a view in side elevation, partly broken away, showing one embodiment of a band saw blade in accordance with the present invention made from the precursor blade of FIG. 1.

To produce a band saw blade 30 of the present invention as shown in FIG. 2, the precursor blade 12 of FIG. 1 is supported in a suitable jig (not shown) while a punch 32 is forced in the direction shown by the arrow in FIG. 2 against each of successive tooth tips 16 to form a primary rake face 34 extending downwardly from tip 16 for a distance of approximately 0.010 to 0.015 inch. This primary rake face 34 has a positive rake angle of approximately 15°, while the secondary rake face 36 extending from the bottom of primary rake face 34 to the gullet 22 has the same 5° positive rake angle as did precursor blade 12.

At the same time that primary rake face 34 is formed, there is also formed a primary end relief surface 38 extending from tip 16 for a distance of approximately 0.008 to 0.018 inch. The primary end relief surface 38 forms a relief angle of approximately 20°, measured with respect to a line connecting the tips of successive teeth. The secondary end relief surface 40 extending from the primary end relief surface to the gullet of the next succeeding tooth forms a relief angle of 35°, identical to that of precursor blade 12.

The positive rake angle of primary rake face 34 is designated as angle A in FIG. 2, while that of secondary rake face 36 is designated B. The relief angle of primary end relief surface 38 is designated C, and the relief angle of secondary end relief surface 40 is designated D.

The teeth 42,42 of the finished blade have a height which is very slightly less than the height of the teeth 14 of precursor blade 12 but the pitch of the finished blade is identical to that of the precursor blade.

The teeth 42 of the finished blade may be given any desired set in any conventional manner either before or after formation of primary rake face 34. It will be appreciated that instead of using an individual punch 32 to form an individual tooth tip 16, a number of punches may be combined together as a unit so as to form the tips of several teeth simultaneously.

The blade 30 when employed for cutting metals or alloys attains a cutting rate equal to that of precursor blade 12, but requires a markedly lower feeding force to achieve this cutting rate. It also achieves a markedly higher cutting rate than the precursor blade when fed with the same force. The teeth 42 exhibit little or no loss in strength as compared to teeth 14, as a result of which blade 30 exhibits a substantially longer life than does blade 12.

Blades of the present invention may be made of any conventional material such as high speed steel, alloy steel, or carbon steel or any composite material including two or more of the foregoing such as in weld-edge bands, and can be of any conventional widths from $\frac{1}{4}$ inch to $2\frac{1}{2}$ inches or more and of conventional thicknesses.

What is claimed is:

1. A saw blade in which each tooth comprises
   a primary rake face extending from the tooth tip for a distance of 0.007 to 0.020 inch and having a positive rake angle of 12° to 25°,
   a secondary rake face extending from the primary rake face to the gullet of the tooth and having a positive rake angle of less than 12°,
   a primary end relief surface extending from the tooth tip for a distance of 0.007 to 0.030 inch and forming a relief angle of 10° to 25°, and
   a secondary end relief surface extending from said primary end relief surface to the gullet of the next succeeding tooth of said blade and forming a relief angle greater than that of said primary end relief surface.

2. A saw blade as claimed in claim 1 in which said secondary rake face has a positive rake angle of 0° to less than 12° and said secondary end relief surface forms a relief angle of 30° to 40°.

3. A saw blade as claimed in claims 1 or 2 in which the height of each tooth measured from the bottom of the gullet perpendicularly to a line joining the tips of successive teeth is equal to 40 to 60% of the pitch of the teeth, and the gullet is an arc having a radius equal to 20 to 30% of the pitch of the teeth.

4. A saw blade as claimed in claims 1 or 2 in which said blade is a band saw blade.

5. A saw blade as claimed in claim 1 or 2 in which said blade is a band saw blade the height of each tooth measured from the bottom of the gullet perpendicularly to a line joining the tips of successive teeth is equal to 40 to 60% of the pitch of the teeth, and the gullet is an arc having a radius equal to 20 to 30% of the pitch of the teeth.

6. A method of making a saw blade as claimed in claim 1 which comprises
   providing a precursor saw blade in which each tooth has a rake face extending from the tip to the gullet having a positive rake angle less than 12° and an end relief surface extending from the tip of said tooth to the gullet of the next succeeding tooth forming a relief angle greater than 20°, and
   applying to the tip of each tooth a deforming force in a direction downwardly and forwardly toward the gullet to form said primary rake face and said primary end relief surface on each said tooth.

7. A method of making a saw blade as claimed in claim 6 in which said saw blade is a band saw blade.

8. A method of making a saw blade as claimed in claim 2 which comprises
   providing a precursor saw blade in which each tooth has a rake face extending from the tip of the gullet having a positive rake angle of 0° to less than 12° and an end relief surface extending from the tip of said tooth to the gullet of the next succeeding tooth forming a relief angle of 30° to 40°, and
   applying to the tip of each tooth a deforming force in a direction downwardly and forwardly toward the gullet to form said primary rake face and said primary end relief surface on each said tooth.

9. A method of making a saw blade as claimed in claim 8 in which said saw blade is a band saw blade.

* * * * *

UNITED STATES PATENT AND TRADEMARK OFFICE
CERTIFICATE OF CORRECTION

PATENT NO. : 4,232,578
DATED : November 11, 1980
INVENTOR(S) : Thomas S. Stellinger et al.

It is certified that error appears in the above-identified patent and that said Letters Patent are hereby corrected as shown below:

Column 1, line 15, "relief" is misspelled;

Column 4, line 52, "of" should be --to--.

Signed and Sealed this

Tenth Day of February 1981

[SEAL]

Attest:

RENE D. TEGTMEYER

Attesting Officer

Acting Commissioner of Patents and Trademarks